United States Patent
Jones et al.

(10) Patent No.: US 9,123,016 B2
(45) Date of Patent: Sep. 1, 2015

(54) METHOD AND APPARATUS PERTAINING TO THE USE OF GROUP RFID TAG INFORMATION

(71) Applicant: Wal-Mart Stores, Inc., Bentonville, AR (US)

(72) Inventors: Nicholaus A. Jones, Fayetteville, AR (US); Bruce W. Wilkinson, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 208 days.

(21) Appl. No.: 13/826,302

(22) Filed: Mar. 14, 2013

(65) Prior Publication Data
US 2014/0266618 A1    Sep. 18, 2014

(51) Int. Cl.
*H04Q 5/22*    (2006.01)
*G06Q 10/08*   (2012.01)

(52) U.S. Cl.
CPC .............. *G06Q 10/087* (2013.01); *G06Q 10/08* (2013.01)

(58) Field of Classification Search
CPC .............................. H04Q 5/22; G06K 7/10366
USPC .................... 340/10.1, 10.32, 5.92, 572.1, 8.1
See application file for complete search history.

(56) References Cited

U.S. PATENT DOCUMENTS

| | | | |
|---|---|---|---|
| 6,026,378 A | 2/2000 | Onozaki | |
| 6,496,806 B1 | 12/2002 | Horwitz | |
| 6,684,980 B2 | 2/2004 | Hungerford, III | |
| 6,897,763 B2 | 5/2005 | Schulmerich | |
| 7,243,001 B2 | 7/2007 | Janert | |
| 7,486,188 B2 | 2/2009 | VanAlstyne | |
| 8,077,041 B2 | 12/2011 | Stern | |
| 8,102,264 B2 | 1/2012 | Rinkes | |
| 8,120,469 B2 | 2/2012 | Adamee | |
| 8,154,408 B2 | 4/2012 | Spindel | |
| 8,321,302 B2 | 11/2012 | Bauer | |
| 8,321,303 B1 | 11/2012 | Krishnamurthy | |
| 8,332,656 B2 | 12/2012 | Jones | |
| 8,669,915 B2 | 3/2014 | Wilkinson | |
| 2005/0021561 A1 | 1/2005 | Noonan | |
| 2007/0073513 A1 | 3/2007 | Posamentier | |
| 2007/0090951 A1 | 4/2007 | Chan | |
| 2008/0100445 A1 | 5/2008 | Horwitz | |
| 2008/0150692 A1* | 6/2008 | Missimer et al. | ............ 340/10.1 |
| 2008/0319575 A1 | 12/2008 | Vahlberg | |
| 2009/0231135 A1 | 9/2009 | Chaves | |
| 2010/0164694 A1* | 7/2010 | Matsubara et al. | ........ 340/10.42 |

(Continued)

OTHER PUBLICATIONS

U.S. Appl. No. 13/803,765, filed Mar. 14, 2013, Ouyang.

(Continued)

*Primary Examiner* — Toan N Pham
(74) *Attorney, Agent, or Firm* — Fitch, Even, Tabin & Flannery LLP

(57) ABSTRACT

A plurality of radio-frequency identification (RFID) tags for corresponding items are read as a group to provide corresponding group information. This group information is used to determine whether at least some of the corresponding items are loose inventory. If desired, a confidence rating as corresponds to this determination can be determined and even displayed. These teachings can then provide for assigning a physical location within a given facility to each of at least some of these items based upon that determination. And again, if desired, a corresponding confidence rating can be determined and displayed as appropriate.

16 Claims, 2 Drawing Sheets

(56) References Cited

U.S. PATENT DOCUMENTS

| | | |
|---|---|---|
| 2011/0276382 A1 | 11/2011 | Ramchandani |
| 2012/0086553 A1 | 4/2012 | Wilkinson |
| 2012/0086554 A1 | 4/2012 | Wilkinson |
| 2012/0161967 A1* | 6/2012 | Stern .......................... 340/572.1 |
| 2012/0161968 A1 | 6/2012 | Bodapati |
| 2012/0235817 A1 | 9/2012 | Forster |
| 2013/0027191 A1 | 1/2013 | Wilkinson |
| 2013/0093591 A1 | 4/2013 | Campero |
| 2014/0035724 A1* | 2/2014 | Rothschild .................... 340/8.1 |

OTHER PUBLICATIONS

U.S. Appl. No. 13/804,772, filed Mar. 14, 2014, Jones
U.S. Appl. No. 13/826,442, filed Mar. 14, 2013, Jones.
EPCGLOBAL; 'EPC(TM) Radio-Frequency Identity Protocols Class-1 Generation-2 UHF RFID Protocol for Communications at 860 MHz-960 MHz Version 1.0.9;' Specification for RFID Air Interface by EPCglobal Inc.; 94 pages, Jan. 2005.
PCT; App. No. PCT/US2014/026323; International Search Report mailed Jul. 25, 2014.
PCT; App. No. PCT/US2014/026323; Written Opinion mailed Jul. 25, 2014.

* cited by examiner

METHOD AND APPARATUS PERTAINING TO THE USE OF GROUP RFID TAG INFORMATION

TECHNICAL FIELD

This disclosure relates generally to radio-frequency identification (RFID) tag reader systems.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. The Electronic Product Code (EPC) as managed by EPCGlobal, Inc. represents one such effort in these regards. EPC-based RFID tags each have a unique serial number to thereby uniquely identify each tag and, by association, each item associated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 is hereby fully incorporated herein by this reference.)

Each EPC-compliant tag has two states for each supported session: "A" and "B." The "A" state comprises the default state and hence represents the tag's state when initially powering up. Once a tag has been read by an RFID-tag reader its state changes from "A" to "B." During the "A" state a tag will respond to any reader that offers a session query. During the "B" state, however, the tag will not again respond to a reader using the same session query. EPC's four different sessions provide for differences with respect to how a read tag persists a "B" state upon losing power.

Pursuant to one approach to system design, RFID-tag reader energy is highly dispersed through a given monitored facility. Examples in such regards can be found, for example, in U.S. patent application Ser. No. 12/900,191, entitled METHOD AND APPARATUS PERTAINING TO RFID TAG READER ANTENNA ARRAY (the contents of which are fully incorporated herein by this reference). Notwithstanding the various benefits afforded by such an approach, in many cases a given RFID tag within such a facility may only be read occasionally as the RFID tag, once read, may persist its "B" state due to the generally-ubiquitous section-wide availability of power. This means, for example, that a tagged item might be read once initially upon first entering the sales floor of a retail facility but will then move quietly (in its "B" state) through the sales floor to a final destination such as a display of loose inventory.

Accordingly, the RFID-tag system may be able to confirm that this particular item entered the sales floor, but will not be able to otherwise account for a present location of that item. Difficulties in these regards are made worse by the fact that many retailers often display identical products in a variety of different locations within their facility. For example, a given item might be stocked as loose inventory on a shelf in a first part of the facility while other identical items are displayed in a so-called end-cap display elsewhere in the same facility. As a result, even knowing via an RFID-tag monitoring system that a particular such item did indeed enter the sales floor, the system will be uncertain as to the actual location of that item within the facility absent more aggressive inventorying methodologies.

BRIEF DESCRIPTION OF THE DRAWINGS

The above needs are at least partially met through provision of the method and apparatus pertaining to the use of group RFID tag information described in the following detailed description, particularly when studied in conjunction with the drawings, wherein.

Figure 1:
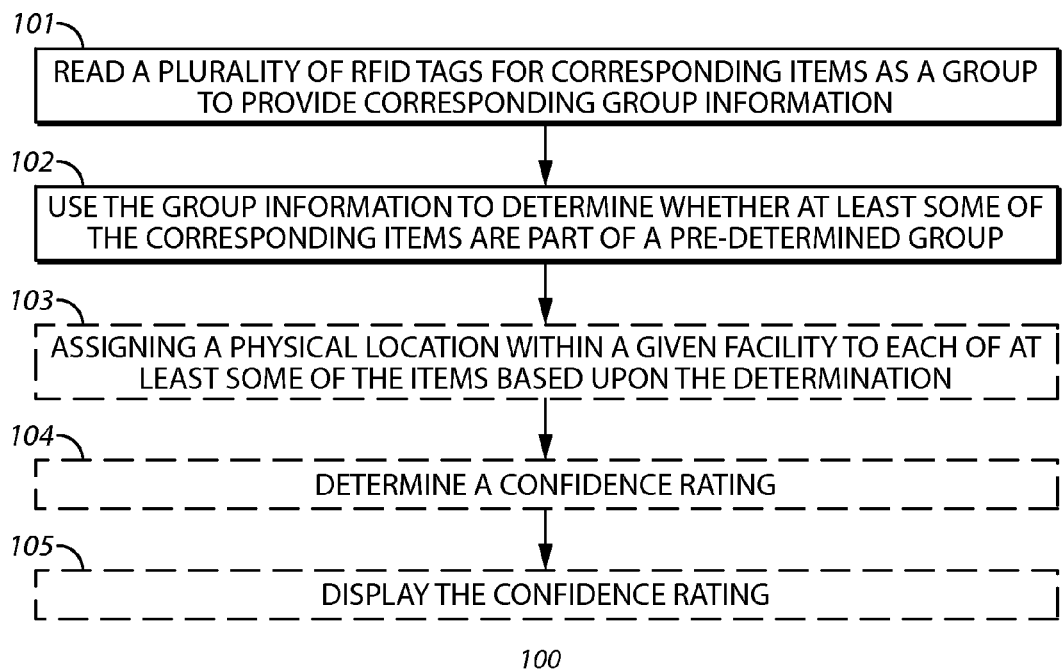
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various approaches, these teachings provide for reading a plurality of radio-frequency identification (RFID) tags for corresponding items as a group to provide corresponding group information. By one approach, this group information is used to determine whether at least some of the corresponding items are part of a pre-stocked retail display or instead comprise, for example, loose inventory. By another approach, this group information serves to determine whether the corresponding items comprise loose inventory or non-loose inventory. If desired, a confidence rating as corresponds to this determination can be determined and even displayed. These teachings can then provide for assigning a physical location within a given facility to each of at least some of these items based upon that determination. And again, if desired, a corresponding confidence rating can be determined and displayed as appropriate.

So configured, the likely physical location of a given item can be reliably determined notwithstanding that the RFID-tag for the item may only be read a single time upon, for example, first entering the sales floor. For example, when the group information corresponds to a previously-known group signature for a given pre-stocked retail display, that correspondence (in combination with, for example, a map that correlates such pre-stocked retail displays with specific or general physical locations within the facility) can serve to assign a corresponding physical location destination to one or more of the tags/items so read.

Similarly, when the group information does not reveal the presence of a previously-known group signature the system can presume that the items are instead loose inventory that are destined to be placed in the corresponding physical location of the facility where the loose inventory for such items are displayed.

As yet another example, an initial grouping of received items to can result in assigning to each RFID-tag record the attribute of loose (as in "loose inventory") or not-loose. When an RFID-tag reader then reads an RFID tag on the sales floor having the loose attribute, the system can presume/assign a good (or better) probability that that particular RFID tag will eventually arrive at the assigned loose-inventory physical location. So configured, one would not need to store group information for any tag; instead a determination can be made as RFID tags are read as to whether a given RFID tag has the not-loose attribute. If desired, one could then query for all the other RFID tags that have a not-loose attribute and that also have a first-seen time-stamp that is similar (or sufficiently similar per some predetermined threshold or measure) to a particular not-loose RFID tag to potentially identify a group of items that are not loosely displayed but that are presented together in an alternative display (such as an enc-cap display).

These and other benefits may become clearer upon making a thorough review and study of the following detailed description. Referring now to the drawings, and in particular to FIG. 1, an illustrative process 100 that is compatible with many of these teachings will now be presented.

Figure 2:
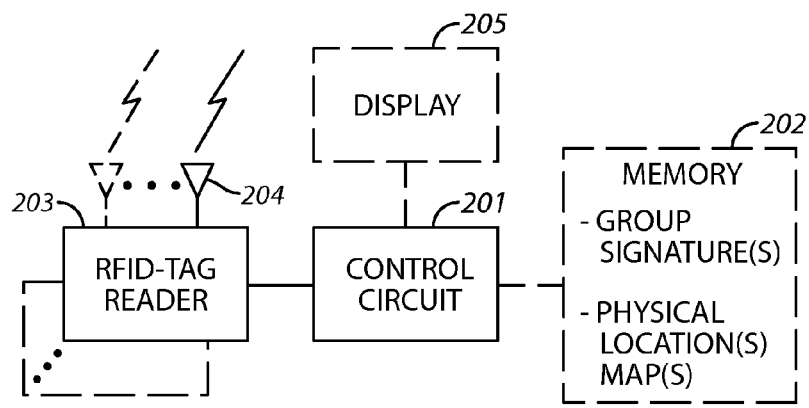
FIG. 2 comprises a block diagram as configured in accordance with various embodiments of the invention.

Referring first, however, to FIG. 2, this process 100 can be carried out at a facility 200 such as (but not limited to) a large retailer or the like. This facility 200 has (or has access to) a control circuit 201. Such a control circuit 201 can comprise a fixed-purpose hard-wired platform or can comprise a partially or wholly-programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

By one optional approach this control circuit 201 operably couples to a memory 202. The memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

This memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

This memory 202 can also store, if desired, information regarding one or more group signatures of interest. These group signatures can each correspond, for example, to a given corresponding group of items that are part of a pre-stocked retail display (where the display is "pre-stocked," for example, at a remote distribution center prior to being shipped to the facility). For example, a particular expected end-cap display can arrive at the facility 200 in a ready-to-display form. In such a case, the end-cap display includes a particular number of each of a variety of items. By way of an illustrative example, the end-cap display might include one hundred of a first item, fifty of a second item, and twenty-five of a third item. The group signature for this end-cap display, then, would reflect that grouping of items.

Such group signatures can be defined at a time of need at the facility itself if desired. By another approach, such group signatures can be provided to the facility by, for example, the distribution center that provides the end-cap display(s). That said, these teachings can also serve in effective ways without using such group signatures, if desired.

This memory 202 can also store, if desired, one or more physical location maps that correlate various items and/or pre-stocked retail displays with various physical locations within the facility 200. These correlations can include, for example, identifying where loose-inventory displays of various items are located (or are to be located) at the facility. These correlations can also include, if desired, identifying where specific pre-stocked retail displays are located (or are to be located) at the facility. By one approach these correlations have include corresponding effective date information to indicate, for example, where a given pre-stocked retail display is to be physically located at the facility during a specified range of dates.

The control circuit 201 also operably couples to one or more RFID-tag readers 203. Each such RFID-tag reader 203, in turn, can operably couple to one or more RFID-tag reader antennas 204. These RFID-tag readers 203 can be configured, for example, to read EPC RFID tags having an "A" inventory state using EPC session 1, 2, or 3. Once read, of course, such EPC RFID tags will switch to the "B" inventory state (i.e., a quiet inventory state) for that particular session.

Also if desired, the control circuit 201 can optionally operably couple to one or more displays 205. These displays can be many and varied as desired and can range from flat-screen computer displays to so-called smartphone displays.

Referring again to FIG. 1, at 101 this process 100 provides for reading a plurality of RFID tags for corresponding items as a group to provide corresponding group information. For the purposes of this illustrative example it will be presumed that these RFID tags comprise EPC-compliant RFID tags. As used herein this reference to reading the RFID tags as a group will be understood to refer to RFID-tag reads as occur during a temporally-contiguous reading event. By one approach this sense of being temporally contiguous can be based upon time stamps that are assigned to each reading of an RFID tag but such an approach is not a requirement.

This temporally-contiguous reading event may span only a few tens of milliseconds or may span many seconds, for example, depending in substantial part upon the number of "A" state RFID tags that are suddenly available to read at a given time. These RFID tags may become suddenly available to read, for example, when a pre-stocked retail display is wheeled from a back storage room onto the main sales floor for the facility 200 and the RFID-tag readers 203 for the main sales floor are suddenly able to illuminate those RFID tags and read them. As another illustrative example in these regards, a number of RFID tags may become suddenly available to read when an associate carries a number of items out from the back storage room to the main sales floor to restock a display of loose inventory.

By one approach the read activity described above refers to reads accomplished by a single RFID-tag reader 203 during the relevant time frame. These teachings will accommodate other approaches in these regards, however. It would be possible, for example, for items being introduced to the main sales floor to be illuminated and read by either of a pair of RFID-tag readers 203 during the same relevant time frame. In such a case these teachings can readily aggregate these multi-sourced reads for the purpose of developing the aforementioned group information.

At 102 the control circuit 201 uses the aforementioned group information to determine whether at least some of the corresponding items are part of a predetermined group such as, for example, are part of a pre-stocked retail display or instead are part of loose inventory. This determination can comprise, for example, comparing information regarding the relative contents of one or more pre-stocked retail displays (as gleaned, for example, by reference to the aforementioned group signatures) and comparing that information against the aforementioned group information.

By another approach, this determination can simply comprise determining whether a given RFID tag is fairly characterized as loose inventory or not-loose items. (As used herein, the expression "not-loose" will be understood to refer to a location/display state that is other than a loose presentation of items in an area that displays such items as a matter of course. Accordingly, "not-loose" items can include items in a pre-made or makeshift end-cap display, items presented in a special sales area of the retail floor, and so forth.) By one approach each read RFID tag is then assigned a corresponding "loose" or "not-loose" attribute (which attribute need not be literally expressed using that precise terminology).

The corresponding determination can then be leveraged in any of a variety of ways. By one optional approach, at 103 the control circuit 201 assigns a physical location with the facility 200 to each of at least some of the items based upon the foregoing determination. For example, upon determining that certain items are likely all part of a particular pre-stocked retail display the control circuit 201 (using, for example, one or more of the aforementioned physical location maps described above) can assign those items to the physical location in the facility 200 where that particular pre-stocked retail display is to be displayed. As another example, upon determining that certain items are not part of any pre-stocked retail display the control circuit 201 can assign those items to the physical location that corresponds to their particular loose inventory displays. And as yet another example, when a particular RFID tag has a loose attribute associated therewith, the control circuit 201 can determine (with some corresponding probability, if desired) that the item associated with that RFID tag is either at, or will soon be at, the loose-inventory display area for that particular item.

This process 100 will accommodate a variety of variations and embellishments as desired. As one illustrative example in these regards, at 104 the control circuit 201 can optionally determine a corresponding confidence rating. By one approach this confidence rating can comprise a confidence rating as corresponds to the determination regarding whether at least some of the items are part of a pre-stocked retail display or are, instead, part of loose inventory. As another illustrative example, this confidence rating can comprise a confidence rating as corresponds to the assignment of the physical location.

These confidence ratings can be based upon any of a variety of static and/or dynamic considerations including but not limited to a historical track record of success or failure as regards such determinations (either in general or on an item-by-item or display-by-display basis), the degree to which the group information matches (or fails to match) any particular group signature, and so forth. If desired, the foregoing historical track record can itself include or be based, in whole or in part, upon previous RFID-tag audits conducted, at least in part, by associates (or others) using handheld RFID-tag scanners and/or handheld optical-code scanners (and/or camera/video equipment when available).

If desired, and as another optional capability, at 105 the control circuit 201 can display information regarding such confidence ratings. Such an activity can comprise, by way of non-limiting examples, presenting the information on one or more computer displays (either locally at the facility 200 and/or remotely at, for example, a headquarters for the retail enterprise that operates the facility 200) and/or causing the information to be displayed at a mobile portable communications device such as a so-called smartphone or a pad/tablet-styled computer using email, texting, or the like.

Figure 3:
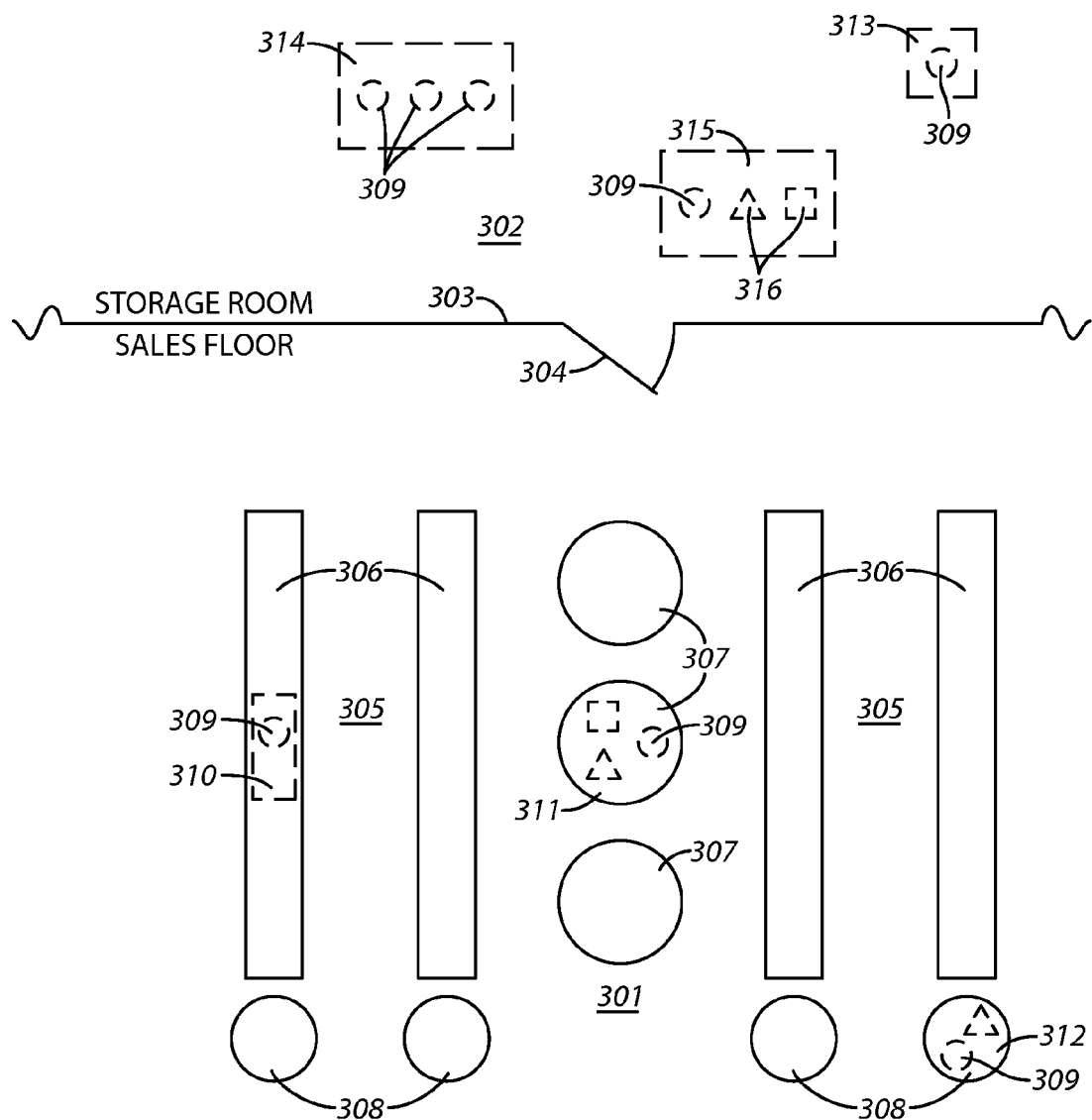
FIG. 3 comprises a top plan schematic view as configured in accordance with various embodiments of the invention.

FIG. 3 presents an illustrative example in these regards. It will be understand that no particular limitations as regards the scope of these teachings are intended by way of the specifics of this example.

In this illustrative example the facility 200 comprises a retail sales facility having a main sales floor 301 and a separate storage room 302. Items displayed on the main sales floor 301 are generally available to the public for inspection and purchase whereas items in the storage room 302 are generally accessible only by authorized associates of the facility 200. Items stored in the storage room 302 will typically comprise either items-in-bulk that will eventually be placed as loose inventory on the main sales floor 301 or are part of a pre-stocked retail display that will also eventually be placed on the main sales floor 301.

In this example a wall 303 separates the storage room 302 from the main sales floor 301. At least one door 304 in the wall 303 provides a way for items to move back and forth between the storage room 302 and the main sales floor 301.

Items being offered for sale on the main sales floor 301 tend to either be offered as loose inventory in one or more dedicated display areas or as a pre-stocked retail display. In this particular example, the main sales floor 301 includes a number of aisles 305 of shelving 306 where loose inventory items are displayed along with a number of pre-stocked retail displays (including both free-standing displays 307 and end-cap displays 308).

The items offered on the main sales floor 301 include a first item 309 that is represented as a circle in this illustration. In this example there are three physical locations on the main sales floor 301 that include this item 309; a loose-inventory display area 310, a free-standing pre-stocked retail display 311, and an end-cap pre-stocked retail display 312.

In a first example, an associate of the facility carries a first load 313 from the storage room 302 to the main sales floor 301 that comprises only a single instance of this first item 309. Upon so entering the main sales floor 301 an RFID-tag reader 203 for the main sales floor 301 reads the RFID tag for this first item 309. This both quiets the tag and informs the control circuit 201 that a single instance of this particular item 309 has entered the main sales floor 301. In such a case, the control circuit 201 can determine that this one item 309 is not part of a larger group of items and is likely being carried by an associate to the loose-inventory display area 310 for this particular item. Accordingly, the control circuit 201 can assign the corresponding known physical location for that area 310 to this item 309. The control circuit 201 can also determine a corresponding confidence rating for those determinations if desired.

In a second example, an associate of the facility carries a second load 314 from the storage room 302 to the main sales floor 301 that comprises multiple instances of the aforementioned first item 309. This second load 314 might comprise, for example, an armload of the first items 309 or, by way of another example, a pallet full of the first items 309. In any event, as this second load 314 enters the main sales floor 301 the relevant RFID-tag reader(s) 203 read at least some of the RFID tags for these first items 309 as a corresponding group. These items 309 as a group, however, do not match the signature of any known pre-stocked retail displays. Accordingly, notwithstanding that there are a number of these items 309 the control circuit 201 nevertheless determines that these items 309 are all loose inventory. As a result, the control circuit 201 then assigns the shelf space 310 for this item 309 as the physical location for these items 309.

In a third example, an associate moves a particular pre-stocked retail display 315 from the storage room 302 to the main sales floor 301. This particular pre-stocked retail display 315 includes some of the aforementioned first item 309 along with certain quantities of other items 316. When the RFID-tag reader(s) 203 reads the corresponding RFID tags for these items 309 and 316 and identifies the corresponding group, the control circuit 201 can identify this pre-stocked retail display 315 as being a specific pre-stocked retail display. With this information the control circuit 201 can then assign a physical location as corresponds to the previously-assigned physical location within the facility 200 for this specific pre-stocked retail display 311.

The foregoing examples are intended to illustrate the scope of these teachings and are not intended to serve as an exhaustive suggestion of possibilities in these regards.

So configured, the likely physical location of specific (tagged) items within a given facility can be determined with considerable accuracy and confidence notwithstanding that the RFID tags for such items might be read only a single time, or only from time to time, and not necessarily when the items are yet at their destination locations. Accordingly, these teachings are well suited for use with an RFID-based item-tracking system that tends to quiet the RFID tag population over time rather than encourage or tolerate the constant or even frequent reading of such tags.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept. As one simple example in these regards, these teachings can serve to simply determine whether a particular RFID tag, when read, is grouped or not with other RFID tags. When ungrouped, the system can conclude that the item corresponding to this RFID tag comprises loose inventory that is destined to be displayed in a loose inventory-display area.

As another example, upon determining that a particular RFID tag comprises non-loose inventory one could then automatically query for all other RFID tags that have a similar non-loose attribute and that have a similar first-seen time stamp as the particular RFID tag (where "similar time stamp" can refer to time stamps that are within some predetermined range of the reference time stamp; for example, time stamps within, say, 1 second, 5 seconds, or 10 seconds of the reference time stamp).

As yet another example, these teachings will accommodate reading RFID tags in a first area (for example, at a loading dock or in a backroom inventory-intake area) and assigning specific RFID tags to a corresponding group at that time. In this case, the grouping assignments can be automated, if desired, or can be undertaken and handled by one or more associates. Another RFID-tag reader (located, for example, in the main sales area or at a portal that joins the former to the latter) can then serve as described above to read at least some of the RFID tags as comprise a part of the assigned group to determine where the grouped RFID tags are likely being moved.

We claim:

1. A method comprising:
    reading a plurality of radio-frequency identification (RFID) tags for corresponding items as a group to provide corresponding group information;
    using the group information to determine whether at least some of the corresponding items are loose inventory;
    assigning a physical location within a given facility to each of at least some of the items where those items are destined to be placed based upon the determination regarding whether at least some of the corresponding items are loose inventory.

2. The method of claim 1 wherein reading the plurality of RFID tags includes causing the plurality of RFID tags to revert to a quiet inventory state.

3. The method of claim 2 wherein the quiet inventory state comprises a B inventory state as specified by a standard denoted as EPC Radio-Frequency Identity Protocols Class-1 Generation-2 UHF RFID Protocol for Communications at 860 MHz-960 MHz Version 1.0.9.

4. The method of claim 1 wherein using the group information to determine whether at least some of the corresponding items are loose inventory comprises also using information regarding relative contents of at least one pre-stocked retail display.

5. The method of claim 4 wherein also using information regarding relative contents of at least one pre-stocked retail display comprises also using information regarding relative contents of a plurality of different pre-stocked retail displays.

6. The method of claim 1 wherein using the group information to determine whether at least some of the corresponding items are loose inventory comprises using the group information to determine whether at least some of the corresponding items are loose inventory or not-loose inventory.

7. The method of claim 1 further comprising:
    determining a confidence rating as corresponds to the assignment of the physical location.

8. The method of claim 7 further comprising:
    determining the confidence rating as a function, at least in part, of previous RFID-tag audits conducted, at least in part, using at least one of:
    a handheld RFID-tag reader;
    a handheld optical-code scanner;
    camera/video equipment.

9. The method of claim 1 wherein the given facility comprises a retail sales facility.

10. A method comprising:
    reading a plurality of radio-frequency identification (RFID) tags for corresponding items as a group to provide corresponding group information;
    using the group information to determine whether at least some of the corresponding items are loose inventory; and
    determining a confidence rating as corresponds to the determinations regarding whether at least some of the corresponding items are loose inventory.

11. The method of claim 10 further comprising:
    displaying the confidence rating.

12. An apparatus comprising:
- at least one radio-frequency identification (RFID)-tag reader configured to read a plurality of radio-frequency identification (RFID) tags for corresponding items as a group to provide corresponding group information;
- a control circuit operably coupled to the at least one RFID-tag reader and configured to use the group information to determine whether at least some of the corresponding items are loose inventory and to assign a physical location within a given facility to each of at least some of the items based upon the determination regarding whether at least some of the corresponding items are loose inventory.

13. The apparatus of claim 12 wherein the control circuit is configured to use the group information to determine whether at least some of the corresponding items are loose inventor by also using information regarding relative contents of at least one pre-stocked retail display.

14. The apparatus of claim 13 wherein the control circuit is configured to also use information regarding relative contents of at least one pre-stocked retail display by also using information regarding relative contents of a plurality of different pre-stocked retail displays.

15. The apparatus of claim 12 wherein the control circuit is configured to use the group information to determine whether at least some of the corresponding items are loose inventory by using the group information to determine whether at least some of the corresponding items are loose inventory or not-loose inventory.

16. The apparatus of claim 12 wherein the control circuit is configured to determine a confidence rating as corresponds to the assignment of the physical location.

* * * * *

UNITED STATES PATENT AND TRADEMARK OFFICE
CERTIFICATE OF CORRECTION

PATENT NO. : 9,123,016 B2
APPLICATION NO. : 13/826302
DATED : September 1, 2015
INVENTOR(S) : Nicholaus A. Jones et al.

Page 1 of 1

It is certified that error appears in the above-identified patent and that said Letters Patent is hereby corrected as shown below:

In the Claims, Column 9, Line 16, Claim 13, delete "inventor" and insert --inventory--, therefor.

Signed and Sealed this
Twenty-third Day of February, 2016

Michelle K. Lee
*Director of the United States Patent and Trademark Office*